US007328237B1

(12) United States Patent
Thubert et al.

(10) Patent No.: US 7,328,237 B1
(45) Date of Patent: Feb. 5, 2008

(54) TECHNIQUE FOR IMPROVING LOAD BALANCING OF TRAFFIC IN A DATA NETWORK USING SOURCE-SIDE RELATED INFORMATION

(75) Inventors: Pascal Thubert, La Colle sur Loup (FR); Eric Levy-Abegnoli, Nice (FR)

(73) Assignee: Cisco Technology, Inc., San Jose, CA (US)

( * ) Notice: Subject to any disclaimer, the term of this patent is extended or adjusted under 35 U.S.C. 154(b) by 714 days.

(21) Appl. No.: 10/205,669

(22) Filed: Jul. 25, 2002

(51) Int. Cl.
*G06F 15/16* (2006.01)
*G06F 15/173* (2006.01)
*H04L 12/28* (2006.01)

(52) U.S. Cl. .................... 709/203; 709/229; 709/238; 709/245; 370/392

(58) Field of Classification Search ................ 709/224, 709/203, 229, 238, 245; 370/392
See application file for complete search history.

(56) References Cited

U.S. PATENT DOCUMENTS

| | | | | |
|---|---|---|---|---|
| 6,128,279 | A * | 10/2000 | O'Neil et al. | 370/229 |
| 6,538,991 | B1 * | 3/2003 | Kodialam et al. | 370/229 |
| 6,611,537 | B1 * | 8/2003 | Edens et al. | 370/503 |
| 6,691,165 | B1 * | 2/2004 | Bruck et al. | 709/227 |
| 6,775,692 | B1 * | 8/2004 | Albert et al. | 709/207 |
| 6,947,992 | B1 * | 9/2005 | Shachor | 709/228 |
| 6,980,549 | B1 * | 12/2005 | Shabtay et al. | 370/392 |
| 2003/0088664 | A1 * | 5/2003 | Hannel et al. | 709/224 |
| 2005/0010653 | A1 * | 1/2005 | McCanne | 709/219 |

OTHER PUBLICATIONS

R. Hinden, Request For Comments No. 1517, entitled, Applicability Statement for the Implementation of Classless Inter-Domain Routing (CIDR) Sep. 1993, Network Working Group, 4 pages.
Rekhter et al, Request For Comments No. 1518, entitled "An Architecture for IP Address Allocatin with CIDR," Sep. 1999, Network Working Group, 23 Pages.
Fuller et al., Request For Comments No. 1519, entitled, "Classless Inter-Domain Routing (CIDR): an Address Assignment and Aggregation Strategy," Sep. 1993, Network Working Group, 21 Pages.

(Continued)

*Primary Examiner*—Jason Cardone
*Assistant Examiner*—Tanim Hossain
(74) *Attorney, Agent, or Firm*—Beyer Weaver LLP

(57) ABSTRACT

According to various aspects of the present invention, a technique is described for improving load balancing of traffic in a data network using source-side related information embedded into the destination IP address field of packets received at a load balancing device. One aspect of the present invention relates to assigning more than one virtual IP address to a server cluster in order to enable different clients to select a virtual cluster address which corresponds to each clients' respective rights and/or profiles, and to use the selected virtual cluster address to access a desired site or service. Another aspect of the present invention relates to a mechanism which allows for load balancing operations to be implemented using source-side information which is embedded into the destination IP address of a packet header. In this way, load balancing decisions may be quickly performed at initial or early stages of a connection flow.

36 Claims, 5 Drawing Sheets

OTHER PUBLICATIONS

Rajahalme et al., "Ipv6 Flow Label Specification," Internet Draft, Mar. 2002, Ipv6Working Group, 7 Pages.

Eidnes et al., Request For Comments No. 2317, entitled, "Classless IN-ADDR.ARPA Delegation," Mar. 1998, Network Working Group, 9 Pages.

Deering et al., Request For Comments No. 2460, entitled, "Internet Protocol, Version 6 (Ipv6)," Dec. 1998, Network Working Group, 39 Pages.

Aviani et al., "Distributed Network Traffic Load Balancing Technique Implemented Without Gateway Router," Application No. 09/569,090, Filed May 10, 2000, 54 Pages.

Aviani et al., "Distributed Network Traffic Load Balancing Technique Implemented Without Gateway Router," Application No. 09/569,083, Filed May 10, 2000, 47 Pages.

* cited by examiner

TECHNIQUE FOR IMPROVING LOAD BALANCING OF TRAFFIC IN A DATA NETWORK USING SOURCE-SIDE RELATED INFORMATION

BACKGROUND OF THE INVENTION

1. Field of the Invention

The present invention relates to transmission of data in a network environment. More specifically, the present invention relates to a technique for improving load balancing of traffic in a data network.

2. Description of Related Art

With the recent explosive growth of the Internet, some Internet sites have experienced a very high demand for their services. Many busy sites require multiple servers to adequately service their demands. It is not uncommon for 20 or 30 servers to be dedicated to a given site. Additionally, many of today's Internet content providers such as, for example, Yahoo.com, utilize a load-balanced server system in order to quickly provide desired content to a plurality of different users at substantially the same time. A block diagram of a conventional load-balanced server system is illustrated in FIG. 1 of the drawings. As shown in FIG. 1, site 110 on the World Wide Web may be implemented using a load-balanced server system in order to respond to data requests from client devices 102 via the Internet 104. The load-balanced server system includes a load balancing device 106, and a plurality of server devices 108. The load balancing device 106 may be configured to perform the functions of a virtual server. When the virtual server receives a data request from the client device 102, it forwards the request to an appropriate server in the server farm 108.

A common way of implementing a server cluster (108) is to use a virtual IP address (VIP) that uniquely identifies a set a servers for particular site (110). Typically, a front-end load balancing device 106 is in charge of advertising the VIP to clients 102; receiving service requests (e.g., TCP connection set-up requests) from clients; dispatching service requests based on server load, requested port, etc.; and remembering the selected server for a given connection/service/session so that subsequent traffic of that connection can be serviced by the same selected server.

It will be appreciated, however, that conventional load balancing techniques do not offer an efficient mechanism for a load balancer to select an appropriate server based on the client identity, or to prioritize requests based on the client identity. One reason for this is that such decisions must be performed very early in the service flow (e.g., at the time when the load balancer receives an initial TCP SYN packet of a TCP connection setup), where very little, if any, information is available about the client. In fact, in most cases, the only information which is available to the load balancer at the initial stage of a service request flow is the client IP address.

Unfortunately, in many cases, the client IP address has been allocated dynamically by some remote DHCP server (unknown from the cluster receiving the request). In other cases, the client IP address is replaced with a proxy IP address corresponding to a proxy-server which may be sitting between the client and the load balancer. Moreover, even if a client were to obtain a static, global IP address, and was able to communicate with the site 110 without using a proxy server, it would be impractical for the load balancer to associate all client IP addresses with respective user profiles so that, for example, Quality of Service (QoS) decisions and/or server selection may be performed by accessing a global directory to obtain desired user profiles of desired global IP addresses.

Accordingly, a common technique used by conventional load balancers to select an appropriate server based on the client identity is to terminate the service request at the load balancer (instead of simply routing the service request), and then collect additional information from the client to be used to in performing its load balancing operations such as, for example, server selection. An example of such a technique is described below.

Typically, when a user at client machine 102 desires to access information from a particular website (e.g., site 110), the user will enter the domain name (e.g., www.cisco.com) at the browser of the client machine ("client") 102. The client 102 will then send a DNS query to a DNS server (e.g., DNS server 112) in order to obtain an IP address associated with the specified domain name. In the example of FIG. 1, assuming that client 102 desires to communicate with site 110, the DNS server 112 will provide client 102 with a virtual IP address associated with site 110. Using the virtual IP address obtained from DNS server 112, client 102 then attempts to establish a TCP connection with site 110, for example, by sending a TCP SYN packet to a destination address corresponding to the virtual IP address.

The TCP SYN packet from client 102 will be received at load balancer 106. Eventually, the load balancer 106 will select an appropriate server from server farm 108 for responding to requests from client 102. However, in order to select an appropriate server, the load balancer 106 will typically require additional information about client 102. For example, the load balancer may base its server selection upon the client identity. However, as described previously, little, if any, information is typically available about the client in the TCP SYN packet. Accordingly, in order to learn more information about client 102, the load balancer 106 accepts the TCP SYN packet and does not forward the TCP SYN packet to any of the servers in the server farm 108. Rather, the load balancer responds with a TCP SYN-ACK packet, which results in a TCP session being established between client 102 and load balancer 106.

The client 102, believing that it is now communicating with a server at site 110, may then transmit an HTTP request to the load balancer 106. When the HTTP request is received at the load balancer, the load balancer may then identify additional information about the client in order to select an appropriate server for servicing the HTTP request. Once an appropriate server has been selected, the load balancer may then forward the HTTP request to the selected server. In this scenario, the load balancer will function as a middle man for relaying communications between client 102 and the selected server. Typically, such a situation is undesirable since, for example, it increases the traffic and processing load on the load balancer, and further increases the response time experienced by the user (since, for example, all of the client's HTTP requests must first be processed by the load balancer before being processed by the server).

Alternatively, once the load balancer has selected an appropriate server for responding to client 102's HTTP request, the load balancer may break the TCP connection with client 102, and send a redirect request so that the client communicates directly with the selected server using an IP address uniquely associated with the selected server. It will be appreciated, however, that this alternate scenario also burdens the resources at the load balancer since, for example, the load balancer is required to establish a TCP connection with the client, and then terminate the TCP connection and send a re-direct request to the client once an appropriate server has been selected. Additionally, the wait time on the client end is increased since, for example, the client 102 must go through the process of establishing a TCP connection with the load balancer 106, sending an HTTP request to the load balancer, breaking the TCP connection with the load balancer, and establishing a new TCP connection with the redirected server.

In light of the above, it will be appreciated that there exists a continual desire to improve network load balancing techniques in order to overcome at least a portion of the problems associated with conventional load balancing techniques.

SUMMARY OF THE INVENTION

According to different embodiments of the present invention, various methods, devices and systems are described for processing incoming packets from a plurality of clients for distribution among a plurality of servers in a data network. A first packet is received from a first client. The first packet includes a destination address field in a header portion of the packet. The destination address field of the first packet is analyzed to identify source-side information included therein. According to a specific embodiment, the source-side information may correspond to a variety of different information related to the user, client, client application(s), etc., such as, for example, user specific information, user preference information, content information, session information, client information, etc. Using the identified source-side information, an appropriate server is selected from the plurality of servers for receiving the packet. The packet is then forwarded to the selected server. According to a specific embodiment, Quality of Service (QoS) processing may also be performed on the first packet using the identified source-side information.

Alternate embodiments of the present invention are directed to methods, systems, and computer program products for processing incoming packets from a plurality of clients for distribution among a plurality of servers in a data network. According to a specific embodiment, the method is implemented by a traffic handling device having a plurality of virtual IP addresses associated therewith. A first packet from a first client is received at a first virtual IP address associated with the traffic handling device. The first virtual IP address is included in a destination address field of the first packet. A second packet from a second client is received at a second virtual IP address associated with the traffic handling device. The second virtual IP address is included in a destination address field of the second packet. Utilizing at least a portion of the first virtual IP address, a first server from the plurality of servers is then selected to receive the first packet. Utilizing at least a portion of the second virtual IP address, a second server from the plurality of servers is then selected to receive the second packet. The first packet is then forwarded to the first server for processing, and the second packet is forwarded to the second server for processing.

Additional objects, features and advantages of the various aspects of the present invention will become apparent from the following description of its preferred embodiments, which description should be taken in conjunction with the accompanying drawings.

DETAILED DESCRIPTION OF THE PREFERRED EMBODIMENTS

According to various aspects of the present invention, a technique is described for improving load balancing of traffic in a data network using source-side related information embedded into the destination IP address field of packets received at a load balancing device. As described in greater detail below, one aspect of the present invention relates to assigning more than one virtual IP address to a server cluster in order to enable different clients to select a virtual cluster address which corresponds to each clients' respective rights and/or profiles, and to use the selected virtual cluster address to access a desired site or service. Another aspect of the present invention relates to a mechanism which allows for load balancing operations to be implemented using source-side information which is embedded into the destination IP address and other portions of a packet header. In this way, load balancing decisions may be quickly performed at initial or early stages of a connection flow using source-side information (e.g., client identity, client rights/privileges, user preferences, user characteristics, session information, etc.) which is embedded in the destination IP address field of received packets, thereby obviating the need for the load balancer to establish/terminate TCP connections with a client in order to obtain additional client-related information for making its load balancing decisions.

One of the factors contributing to the problems ascribed to conventional load balancing techniques (as discussed previously) relates to the format of conventional IP addressing schemes such as that defined, for example, by Version 4 of the Internet protocol (IPv4) which is described, for example, in IETF RFCs1517, 1518, 1519, and and RFC 2317, each of which is herein incorporated by reference in its entirety for all purposes. According to the IPv4 standard, IP addresses are defined to have a 32-bit length, in which a most significant portion of the IP address is used to specify a network prefix or subnet, and a least significant portion of the IP address is used to specify a particular host within that subnet. This is illustrated in FIG. 2 of the drawings.

Figure 2:
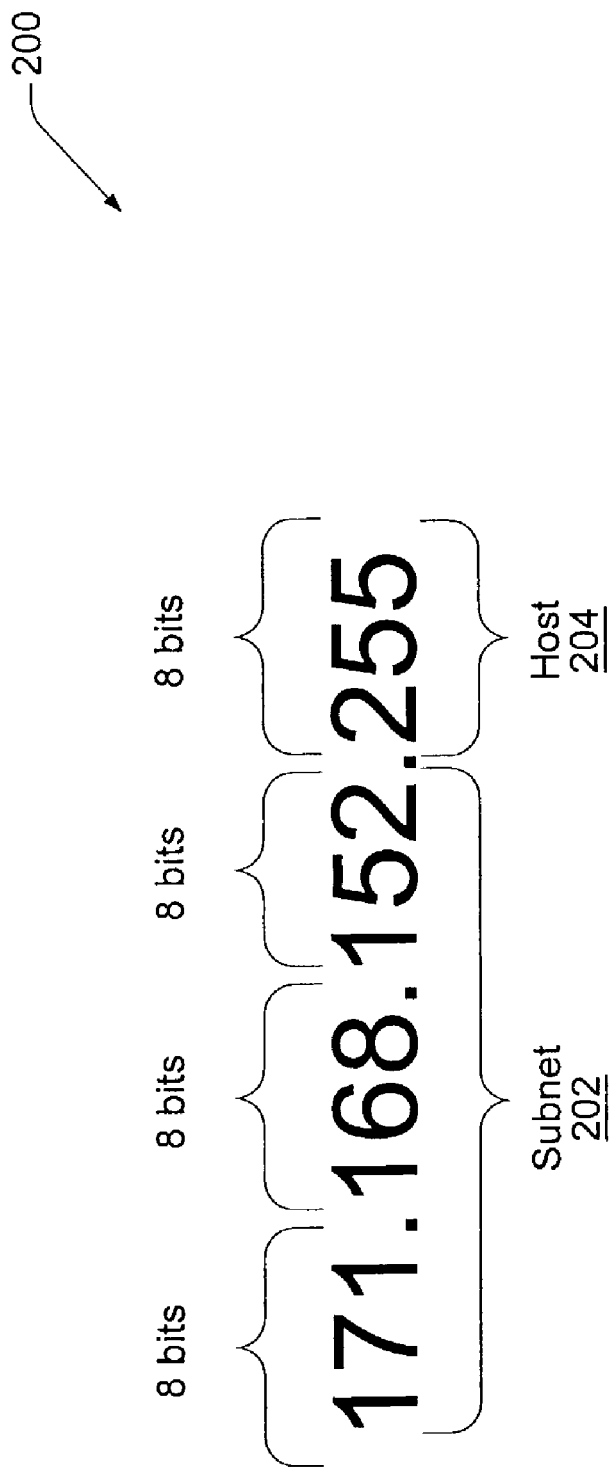
FIG. 2 shows an example of an IP address 200 which has been implemented in accordance with the IPv4 standard.

FIG. 2 shows an example of an IP address 200 which has been implemented in accordance with the IPv4 standard. As illustrated in FIG. 2, the IP address 200 includes a subnet portion 202 and a host portion 204. In the example of FIG. 2, the length of the subnet portion 202 is 24 bits, and the length of the host portion 204 is 8 bits. However, the respective lengths of the subnet portion and host portion may vary, so long as the total length of the IP address is 32 bits.

Due to the exponential growth of the Internet, the 32-bit IP addressing scheme of IPv4 has resulted in a relative shortage of available addressing space across the Internet. Because of this scarcity in addressing space, it is generally considered undesirable to assign an entire subnet of Ipv4 addresses to a given network device such as, for example, a load balancing device.

Figure 3A:
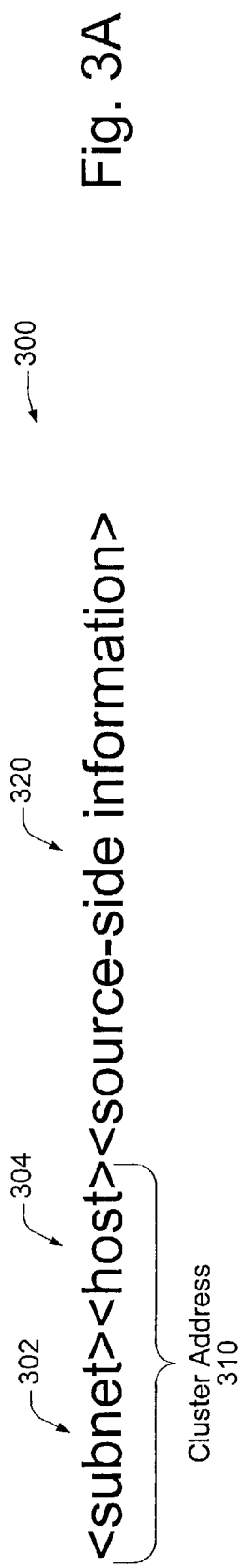
FIG. 3A shows an example of an IP address format 300 which may be used to implement various aspects of the present invention.

FIG. 3A shows an example of an IP address format 300 which may be used to implement various aspects of the present invention. As described previously, one aspect of the present invention relates to a technique for embedding source-side information into the destination IP address field of a packet (and possibly other portions of a packet header, such as, for example, the flow label field, etc.) in order to allow traffic handling devices to utilize the embedded information when performing various operations such as, for example, routing, forwarding, and/or load balancing operations relating to that packet. Thus, for example, as shown in the embodiment of FIG. 3A, an IP address format of the present invention may include a subnet portion 302, a host portion 304, and a source-side information portion 320. In one embodiment, the subnet portion 302 and host portion 304 may be utilized for expressing a particular cluster address 310.

According to specific implementations, the source-side information portion 320 of the IP address 300 may correspond to a variety of different source-side information related to the user, client, application, etc. For example, such source-side information may include, for example, user specific information (e.g., subscription privileges, age, language, gender, etc.); user preference information (e.g., display preferences, content preferences, subject matter preferences, etc.); information about the content to be requested (e.g., size, type, subject matter, etc.); information about the session (e.g., cookie information, preferred encoding information, protocol information, etc.); information about the client (e.g., client identity, installed hardware components, installed software components, etc.); etc.

It will be appreciated that, although some of the source-side information described above may be included in subsequent HTTP requests from the client, it may be advantageous to embed selected source-side information into the destination IP address of earlier packets in order to allow the load balancer to select the most appropriate server for responding to subsequent client requests. For example, even though content specific information may be provided in an HTTP request from the client following the TCP connection establishment, encoding or embedding of such information into the destination address of the TCP SYN packet (sent from the client to the load balancer) enables the load balancer to select an appropriate server for providing to the client the content which will be requested in the subsequent HTTP request. Similarly, by encoding or embedding session information (e.g., cookie information) into the destination IP address of a TCP SYN packet, the load balancer is able to utilize such information to perform its selection of the appropriate target server, effectively allowing the load balancer to function as a "session router", wherein routing decisions may be based upon session identification information encoded into the destination IP address field of a packet.

Figure 3B:
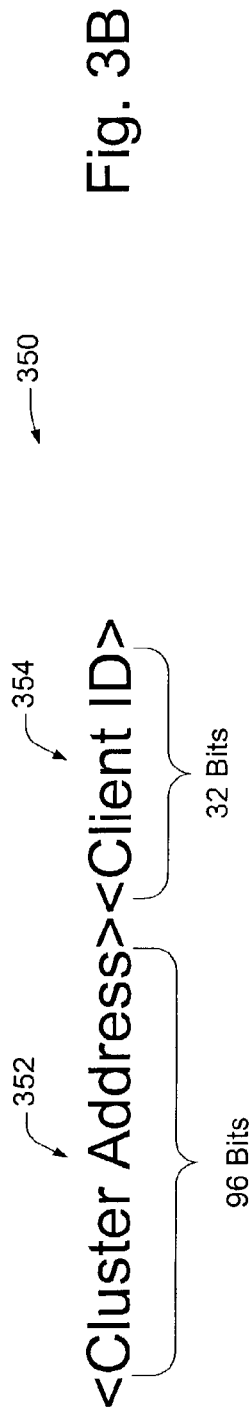
FIG. 3B shows an example of an IP address format 350 which may be used to express virtual IP addresses associated with a load balancer for a particular cluster of servers.

It will be appreciated that the modified IP address of the present invention (which includes embedded source-side information such as that illustrated in FIG. 3) may be applied to any conventional IP address format. For example, the technique of the present invention may be implemented in a network which utilizes an Ipv4 protocol, for example, by assigning a subnet (e.g., a 28-bit subnet) to a server cluster, and base the IP address within that subnet on the class of service. In such an implementation, the embedded source-side information portion (e.g., the least significant 8-bit of the 32-bit destination IP address) of the destination IP address may be used to determine the class of service associated with a particular received packet and/or a particular flow. Additionally, it is noted that the technique of the present invention is particularly useful for IP addresses implemented in accordance with Internet protocol version 6 (IPv6), as described in IETF RFC 2460, herein incorporated by reference in its entirety for all purposes. IPv6 defines a 128-bit IP address, which allows for an enormous amount of addressing space. Using IPv6, for example, a large number of addresses could be assigned to the same server cluster. For example, using only 96 bits to define the cluster address portion of the 128-bit IP address, more than 4 billion virtual IP addresses may be assigned to that cluster, wherein each of the virtual IP addresses may be used to characterize a specific type of client. This is illustrated, for example, in FIG. 3B of the drawings.

FIG. 3B shows an example of an IP address format 350 which may be used to express virtual IP addresses associated with a load balancer for a particular cluster of servers. As illustrated in FIG. 3B, the virtual IP address format 350 includes a cluster address portion (352) of 96 bits and a Client ID portion (354) of 32 bits. The total length of the virtual IP address is 128 bits, which conforms with the IPv6 standard. According to a specific embodiment, a load balancer may utilize the Client ID portion 354 of the destination IP address field of a received packet to identify desired source-side information relating to a client which sent the packet, and then select an appropriate server for responding to requests from that particular client, based, at least in part, upon the Client ID portion 354. In one implementation, the load balancer may maintain a local directory of client IDs in which one or more servers are associated with specific client IDs. Alternatively, rather than maintaining client directory, the 32-bit portion 354 of the virtual IP address may include encoded information relating to the requesting client's rights and/or priorities. Thus, for example, when the load balancer receives a packet with the client's rights and/or priorities embedded into the destination IP address field of the packet header, the load balancer may use the embedded information to identify or determine the client's rights and/or profile, and base its server selection at least in part upon such information. The load balancer may also base its server selection upon other conventional load balancing parameters such as, for example, server load.

According to different embodiments of the present invention, a variety of different techniques may be used for generating the modified IP address of the present invention. According to one embodiment, the modified IP address may be generated by one or more DNS servers in response to a DNS lookup request. For example, in one implementation, different DNS servers may be used to provide different virtual IP addresses for the load balancer 106 of FIG. 1. One group of DNS servers, for example, may correspond to a high privilege DNS server group, and another group of DNS servers may correspond to a low privilege DNS server group. Clients 102 may then be configured to access specific DNS servers according to each client's privileges, rights, priorities, and/or other characteristics. In an alternate embodiment, one or more DNS servers may be configured to analyze client information which it obtains from DNS lookup requests, and provide appropriate Virtual IP addresses (which include embedded source-side information) to the requesting clients. The clients may then use the modified IP address provided by the DNS server as a destination IP address when crafting a packet to be sent to the site 110.

In an alternate embodiment, a lightweight application may be implemented at a client machine 102 for generating a modified IP address in accordance with the technique of the present invention. According to a specific embodiment, a modified IP address may be generated at the client 102 by modifying an address (e.g., virtual IP address) provided by a DNS server to include embedded information. According to different embodiments, the embedded information may correspond to information obtained from a site administrator, and/or may correspond to other information such as, for example, user specific information (e.g., subscription privileges, age, language, gender, etc.); user preference information (e.g., display preferences, content preferences, subject matter preferences, etc.); information about the content to be requested (e.g., size, type, subject matter, etc.); information about the session (e.g., cookie information, preferred encoding information, protocol information, etc.); information about the client (e.g., client identity, installed hardware components, installed software components, etc.); etc.

According to one embodiment, one or more encryption keys may be distributed to selected clients. The encryption keys may be used by the selected clients to generate the source-side information portion 320 of the modified IP address. Additionally, other criteria such as, for example, client specific information (e.g., time of day, local IP address, local TCP port, etc.) may also be used in computing the source-side information portion 320. In one implementation, the source-side information 320 may only be valid for a single use, and may only be decoded by the dispatcher or load balancer. It will be appreciated that, such an implementation may be advantageous in minimizing security risks since it will be difficult for a hacker or other third party to spoof the source-side information portion of the modified IP address.

Figure 1:
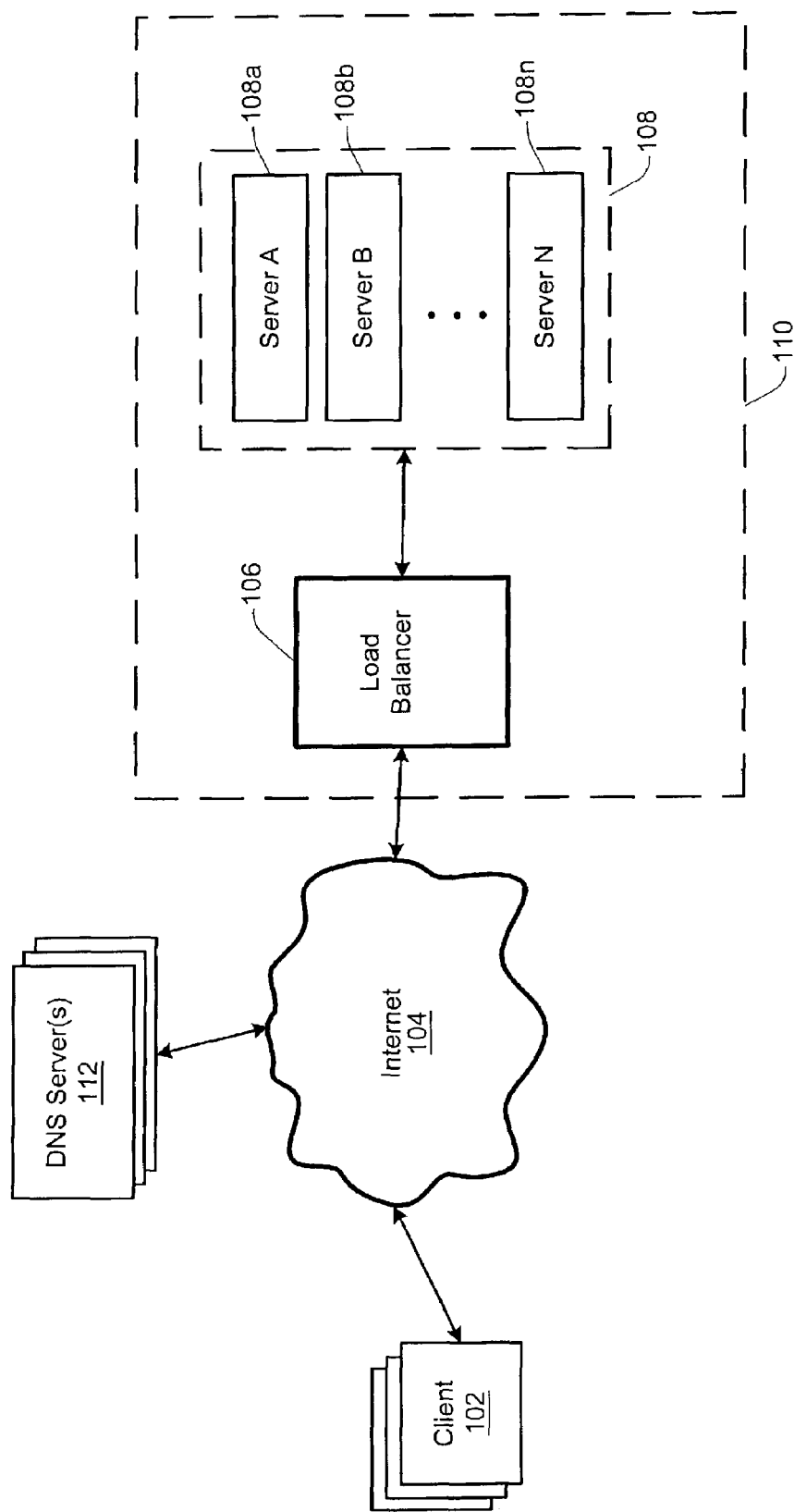
FIG. 1 shows an environment of an exemplary load-balanced multiple server site.

In order to illustrate various aspects of the present invention, a specific embodiment of the present invention will now be described by way of example with reference to FIG. 1 of the drawings. In this example, it is assumed that site 110 includes a plurality of servers 108, in which some of the servers are relatively fast servers, and other servers of the cluster are relatively slow. Certain privileged customers (e.g., some of the clients 102) are provided with an encryption key for communicating with site 110. When one of the privileged customers desires to access site 110, the privileged client may first perform a DNS lookup request for the site URL (e.g., www.cisco.com). A DNS server 112 may respond by providing to the privileged client a 128-bit address ("A") associated with site 110. An application (e.g., a lightweight IP address modification application) at a privileged client may use its encryption key to generate a particular suffix (S) of length L. The application may then substitute the suffix S into the least significant L bits of address A to thereby produce a modified IP address ("A[S]"), which may be used for communicating with site 110. According to specific embodiments, the length L of the suffix S may vary, depending upon various factors such as, for example, available address space, number of privileged clients in the network, etc. An example of the suffix length L is 32 bits. Non-privileged customers are not required to have and/or utilize the IP address modification application, and simply use address A for communicating with site 110. When the load balancer 106 receives a packet from one of the customers, it may identify the destination IP address as either A or A[S], and may use the identified destination IP address to dispatch privileged customers to the relatively faster servers and non-privileged customers to the relatively slower servers of the server cluster.

Figure 4:
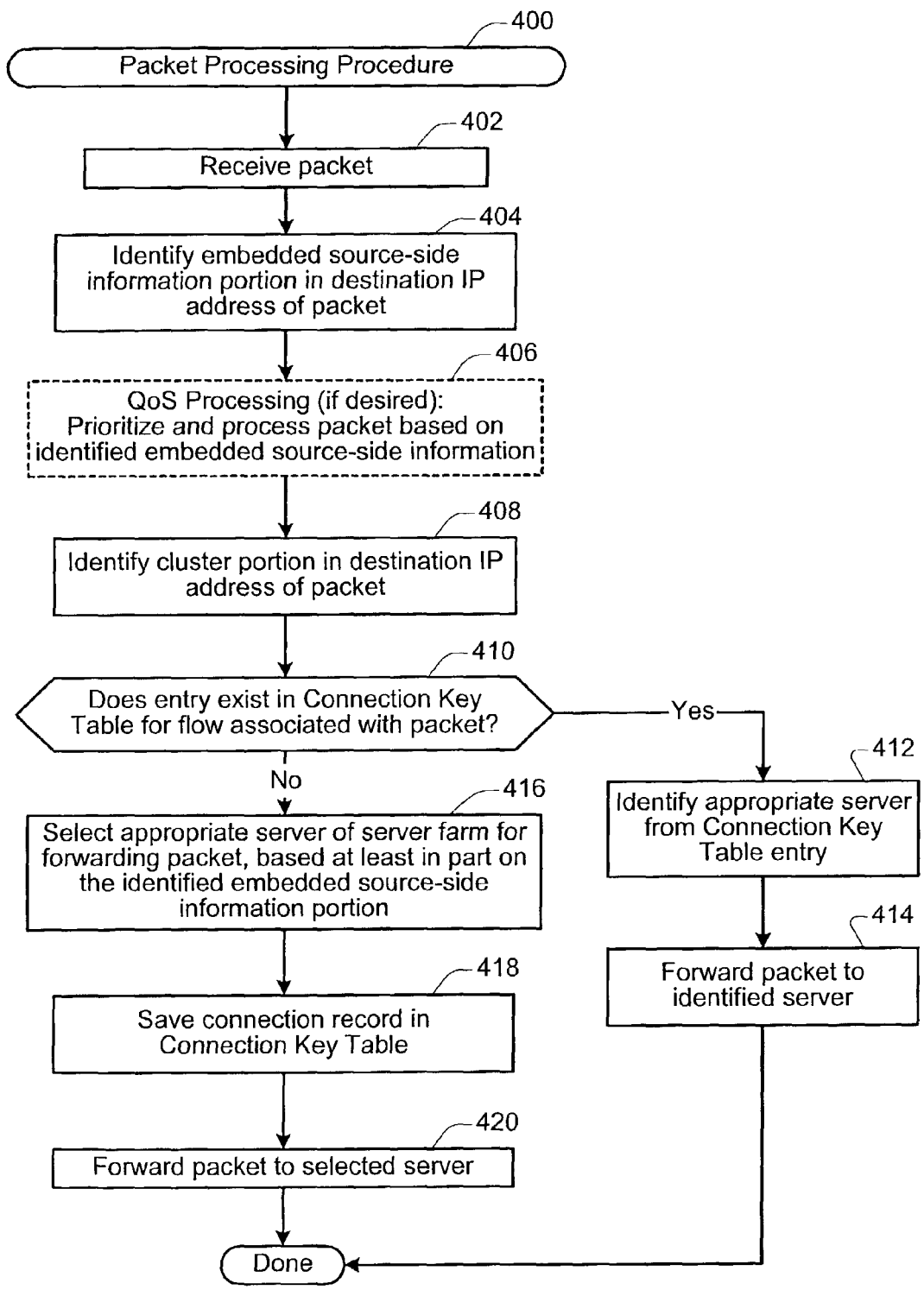
FIG. 4 shows a flow diagram of a Packet Processing Procedure 400 which may be implemented in accordance with a specific embodiment of the present invention.

FIG. 4 shows a flow diagram of a Packet Processing Procedure 400 which may be implemented in accordance with a specific embodiment of the present invention. According to one embodiment, the Packet Processing Procedure may be implemented at a dispatcher or load balancer such as, for example, load balancer 106 of FIG. 1. Initially, as shown at 402, a packet is received from a client. According to a specific implementation, the packet may correspond to an initial session packet used for establishing a communication session between the client and a server at site 110. An example of such a packet is a TCP SYN packet.

Upon receiving the packet, the load balancer may identify (404) source-side information which has been encoded or embedded into the destination IP address field of the received packet. In alternate embodiments, the load balancer may also identify additional source-side information which has also been embedded in to other portions of the packet header such as, for example, the flow label field of the packet header. If desired, the load balancer may use the identified source-side information to perform (406) QOS processing on the received packet. Possible actions which may be performed during the QOS processing may include, for example, immediately processing the packet, discarding the packet, holding or delaying processing of the packet, etc.

Figure 5:
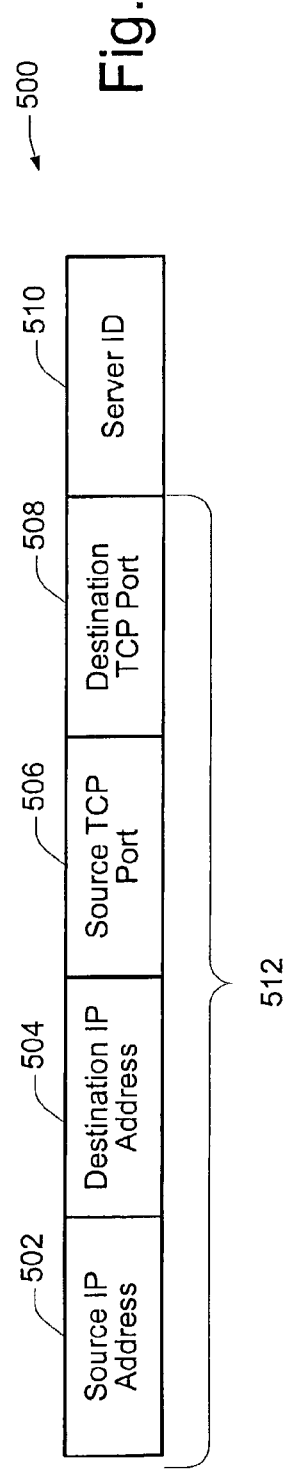
FIG. 5 shows an example of an data structure 500 which may be used for implementing various aspects of the present invention.

At 408 the load balancer identifies the cluster address portion of the destination IP address. A determination is then made (410) as to whether an entry exists in a local Connection Key Table for the flow associated with the received packet. According to a specific embodiment, the load balancer may maintain specific information in a local Connection Key Table which may be used, for example, for associating a specific flow with one or more specific servers in the server cluster. FIG. 5 shows an example of an entry 500 which may be included in the local Connection Key Table.

As illustrated in FIG. 5, each entry 500 of the Connection Key Table may include information relating to a specific flow between a client and a server including, for example, source IP address information 502, destination IP address information 504, source TCP port information 506, destination TCP port information 508, server ID information 510, etc. In one implementation, the load balancer may utilize the source IP address, destination IP address, source TCP port, and destination TCP port information in the header of a received packet as a key (512) for identifying a particular server (e.g., server ID 510) associated with a given flow. It will be appreciated that alternate embodiments of the Connection Key Table may include information different from that illustrated in FIG. 5. Such other information may depend upon specific implementations of the present invention, and may be determined by one having ordinary skill in the art.

Returning to flow point 410 of FIG. 4, if it is determined that an entry does exist in the Connection Key Table for the flow associated with the received packet, the server which has been assigned to that particular flow may be identified (412) using information in the Connection Key Table. Thereafter, the received packet may be forwarded (414) to the identified server for handling.

If, however, it is determined that an entry does not exist in the Connection Key Table for the flow associated with the received packet, an appropriate server from the server cluster may be selected (416) for forwarding the packet. In at least one implementation, selection of the appropriate server may be based, at least in part, upon the identified source-side information included in the destination IP address field of the packet. Selection of the appropriate server may also be based, at least in part, upon conventional load balancing criteria such as, for example, server load.

Once an appropriate server has been selected, a connection record may be saved (418) as an entry in the Connection Key Table. In one implementation, the connection record may include information similar to that shown in entry 500 of FIG. 5. Thereafter, the received packet may then be forwarded (420) to the selected server which has been assigned to that particular flow. According one embodiment, if at least some of the servers of the server cluster 108 are sharing the same prefix (e.g., cluster address portion), the destination address of the forwarded packet may be unchanged. Alternatively, the destination address of the forwarded packet may be modified by the load balancer, for example, when performing network address translation.

According to a specific embodiment, after an initial packet for a particular flow has been assigned and forwarded to a selected server in the server cluster, subsequent communication during that session between the client and the server may be achieved via direct communication between the client and server. For example, when the load balancer receives a TCP SYN packet from a client, it may use the embedded source-side information in the destination IP address field of the TCP SYN packet to select an appropriate server and forward the TCP SYN packet to the selected server for handling. Upon receiving the TCP SYN packet, the selected server may respond to the client with a TCP SYN-ACK packet, whereupon a TCP connection may then be established directly between the client and the server. In one implementation, packets from the client to the server may be routed through the load balancer 106, whereupon the load balancer may function as a common router in forwarding the packets from the client to their final destination. Additionally, it will be appreciated that, in specific embodiments, the load balancing operations may be performed by the load balancer without having to establish an initial TCP session with the client in order to obtain additional client related information, for example.

According to alternate embodiments, the technique of the present invention may also be used for encoding or embedding source-side information into the source IP address of a packet. However, one disadvantage of this approach is that the source IP address of the packet may be subject to modification and/or substitution by various network devices (e.g., proxy servers) as the packet traverses the network from the client to the load balancer. In contrast, the destination IP address field of the packet is less likely to be modified or changed as the packet traverses the network to its final destination.

Another advantage of the technique of the present invention is that, unlike information which is encoded at layer 3 or above, specific embodiments of the present invention allow a load balancer or dispatcher to route or forward a client request without first having to establish a TCP session with the client. This, in turn, helps to reduce the delay in establishing an end-to-end connection between the client and the server. Another advantage of the technique of the present invention is that it enables servers within a server cluster to respond directly to the clients, if desired, without requiring that the responses be routed through the dispatcher or load balancer on the way back to the clients.

Other Embodiments

Generally, the load balancing techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the load balancing technique of this invention may be implemented on a general-purpose programmable machine selectively activated or reconfigured by a computer program stored in memory. Such programmable machine may be a network device designed to handle network traffic, such as, for example, a router or a switch. Such network devices may have multiple network interfaces including frame relay and ISDN interfaces, for example. Specific examples of such network devices include routers and switches. For example, the load balancing devices of this invention may be specially configured routers or servers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the load balancing technique of this invention may be implemented on a general-purpose network host machine such as a personal computer or workstation. Further, the invention may be at least partially implemented on a card (e.g., an interface card) for a network device or a general-purpose computing device.

Figure 6:
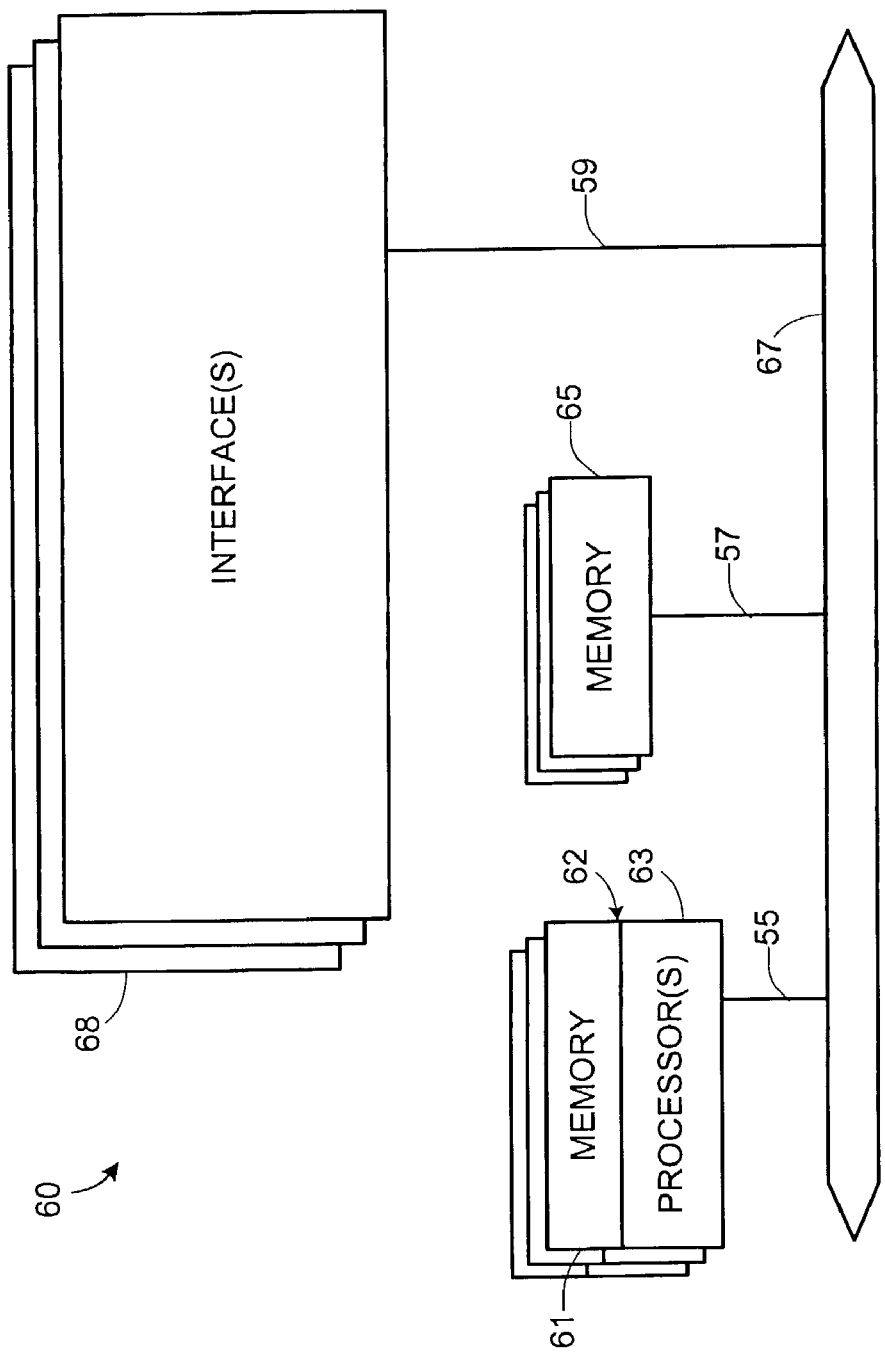
FIG. 6 shows a network device 60 suitable for implementing various aspects of the present invention.

Referring now to FIG. 6, a network device 60 suitable for implementing the load balancing techniques of the present invention includes a master central processing unit (CPU) 62, interfaces 68, and a bus 67 (e.g., a PCI bus). When acting under the control of appropriate software or firmware, the CPU 62 may be responsible for implementing specific functions associated with the functions of a desired network device. For example, when configured as a dispatcher or load balancer device, the CPU 62 may be responsible for analyzing packets, encapsulating packets, forwarding packets to appropriate network devices, servers, etc. The CPU 62 preferably accomplishes all these functions under the control of software including an operating system (e.g. Windows NT), and any appropriate applications software.

CPU 62 may include one or more processors 63 such as a processor from the Motorola family of microprocessors or the MIPS family of microprocessors. In an alternative embodiment, processor 63 is specially designed hardware for controlling the operations of network device 60. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets over the network and sometimes support other peripherals used with the network device 60. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

Although the system shown in FIG. 6 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, memory block 65) configured to store data, program instructions for the general-purpose network operations and/or other information relating to the functionality of the load balancing techniques described herein. The program instructions may control the operation of an operating system and/or one or more applications, for example. The memory or memories may also be configured to store data structures, session information, connection information, and/or other specific non-program information described herein.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). the invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

The invention claimed is:

1. A method of processing incoming packets from a plurality of clients for distribution among a plurality of servers in a data network, the method comprising:
   generating a modified destination IP address of a first packet using a virtual IP address received in response to a DNS look-up request, by execution of an IP address modification application at a first client, wherein the modified destination IP address includes embedded source-side information derived using encrypted keys in conjunction with the IP address modification application;
   configuring the first client to access one or more specific DNS servers based on rights and privileges of the first client;
   receiving a first packet from the first client;
   the first packet including a destination Internet Protocol (IP) address field in a header portion of the packet, the destination IP address field having a subfield for embedding source-side information including one or more of user-specific data, user preference data, requested content, first client priority information, and first client privilege information;
   analyzing the destination IP address field of the first packet to identify source-side information embedded therein;
   selecting, using said identified source-side information, an appropriate server from the plurality of servers; and
   forwarding the first packet to the appropriate server.

2. The method of claim 1 wherein the first packet corresponds to a TCP SYN packet.

3. The method of claim 2 further comprising forwarding the TCP SYN packet to a selected server of the plurality of servers.

4. The method of claim 3 wherein the TCP SYN packet is forwarded to a selected server of the plurality of servers without first establishing a TCP connection with the first client.

5. The method of claim 1 wherein the source-side information includes information relating to an identity of the first client.

6. The method of claim 1 wherein the source-side information includes information relating to user specific information.

7. The method of claim 1 wherein the source-side information includes information relating to user preference information.

8. The method of claim 1 wherein the source-side information includes information relating to requested content.

9. The method of claim 1 wherein the source-side information includes session information relating to the first client.

10. The method of claim 1 wherein the source-side information includes Quality of Service (QoS) information relating to the first client.

11. The method of claim 1 wherein the source-side information includes priority information relating to the first client.

12. The method of claim 1 wherein the source-side information includes privilege information relating to the first client.

13. The method of claim 1 further comprising performing Quality of Service (QoS) processing on the first packet using said source-side information.

14. The method of claim 1 wherein the first packet is associated with a first flow;
   wherein the destination address field of the first packet includes flow information;
   wherein said flow information includes source IP address information, destination IP address information, source TCP port information, and destination TCP port information;
   determining, using said flow information, whether any server of the plurality of servers has been associated with the first flow; and
   forwarding the first packet to an associated server in response to determining that at least one server of the plurality of servers has been associated with the first flow.

15. The method of claim 1 wherein the destination address field of the first packet includes embedded information relating to at least one aspect of the first client.

16. The method of claim 1 wherein the destination address field of the first packet includes:
   a cluster address portion which includes subnet and host address information; and
   source-side information relating to at least one aspect of the first client.

17. A computer program product, including a machine-readable medium storing program instructions embodied therein, for implementing the method of claim 1.

18. A method as recited in claim 1 further comprising:
   determining that the least significant bits of the destination IP address are not modified.

19. A method as recited in claim 1 wherein the embedded source-side information has a length L in the least significant bits of the modified destination IP address.

20. A system of processing incoming packets from a plurality of clients for distribution among a plurality of servers in a data network, the system comprising:
- means for generating a modified destination IP address of a first packet using a virtual IP address received in response to a DNS look-up request, by execution of an IP address modification application at a first client, wherein the modified destination IP address includes embedded source-side information derived using encrypted keys in conjunction with the IP address modification application;
- means for configuring the first client to access one or more specific DNS servers based on rights and privileges of the first client;
- means for receiving a first packet from the first client;
- the first packet, including a destination Internet Protocol (IP) address field in a header portion of the packet the destination IP address field having a sub-field for embedding source-side information including one or more of user-specific data, user preference data, requested content, first client priority information, and first client privilege information;
- means for analyzing the destination address field of the first packet to identify source-side information embedded therein;
- means for selecting, using said source-side information, an appropriate server from the plurality of servers; and
- means for forwarding the first packet to the appropriate server;
- wherein the destination address field of the first packet includes:
- a cluster address portion which includes subnet and host address information.

21. A system of processing incoming packets from a plurality of clients for distribution among a plurality of servers in a data network, the system comprising:
- at least one processor;
- at least one interface configured or designed to provide a communication link to at least one other network device in the data network; and
- memory;
- the system being configured or designed to generate a modified destination IP address of a first packet using a virtual IP address received in response to a DNS look-up request by execution of an IP address modification application at the first client, wherein the modified destination IP address includes embedded source-side information derived using encrypted keys in conjunction with the IP address modification application; and
- configured or designed to enable the first client to access one or more specific DNS servers based on rights and privileges of the first client; and
- configured or designed to receive a first packet from the first client;
- the first packet including a destination Internet Protocol (IP) address field in a header portion of the packet the destination IP address field having a sub-field for embedding source-side information including one or more of user-specific data, user preference data, requested content, first client priority information, and first client privilege information;
- the system being further configured or designed to analyze the destination address field of the first packet to identify source-side information embedded therein;
- the system being further configured or designed to select, using said identified source-side information, an appropriate server from the plurality of servers; and
- the system being further configured or designed to forward the first packet to the appropriate server.

22. The system of claim 21 wherein the first packet corresponds to a TCP SYN packet.

23. The system of claim 22 being further configured or designed to forward the TCP SYN packet to a selected server of the plurality of servers.

24. The system of claim 23 wherein the TCP SYN packet is forwarded to a selected server of the plurality of servers without first establishing a TCP connection with the first client.

25. The system of claim 21 wherein the source-side information includes information relating to an identity of the first client.

26. The system of claim 21 wherein the source-side information includes information relating to user specific information.

27. The system of claim 21 wherein the source-side information includes information relating to user preference information.

28. The system of claim 21 wherein the source-side information includes information relating to requested content.

29. The system of claim 21 wherein the source-side information includes session information relating to the first client.

30. The system of claim 21 wherein the source-side information includes Quality of Service (QoS) information relating to the first client.

31. The system of claim 21 wherein the source-side information includes priority information relating to the first client.

32. The system of claim 21 wherein the source-side information includes privilege information relating to the first client.

33. The system of claim 21 being further configured or designed to perform Quality of Service (QoS) processing on the first packet using said source-side information.

34. The system of claim 21 wherein the first packet is associated with a first flow;
- wherein the destination address field of the first packet includes flow information;
- wherein said flow information includes source IP address information, destination IP address information, source TCP port information, and destination TCP port information;
- the system being further configured or designed to determine, using said flow information, whether any server of the plurality of servers has been associated with the first flow; and
- the system being further configured or designed to forward the first packet to an associated server in response to determine that at least one server of the plurality of servers has been associated with the first flow.

35. The system of claim 21 wherein the destination address field of the first packet includes embedded information relating to at least one aspect of the first client.

36. The system of claim 21 wherein the destination address field of the first packet includes:
- a cluster address portion which includes subnet and host address information; and
- source-side information relating to at least one aspect of the first client.

* * * * *